Jan. 12, 1965   K. L. WOODMAN   3,165,201
DISPOSABLE ELEMENT REFLECTOR PAN
Filed April 26, 1963

WITNESSES
Theodore T. Wrobel
James T. Young

INVENTOR
Kenneth L. Woodman
BY
Francis E. Blake
ATTORNEY

United States Patent Office 3,165,201
Patented Jan. 12, 1965

3,165,201
DISPOSABLE ELEMENT REFLECTOR PAN
Kenneth L. Woodman, Mansfield, Ohio, assignor to Westinghouse Electric Corporation, Pittsburgh, Pa., a corporation of Pennsylvania
Filed Apr. 26, 1963, Ser. No. 275,973
1 Claim. (Cl. 206—56)

This invention relates to cooking ranges and more particularly to disposable combination heat reflector and drip collector elements for a range heating unit.

It is well known that much heat is wasted in a conventional cooking range by being transmitted to and absorbed in the heat box beneath the range surface. In order to minimize such heat losses, reflector elements are placed beneath the heating units to reflect heat upwardly to the cooking surface and to also collect pan drippings. Obviously such reflector elements must be periodically cleaned and when such elements are formed of aluminum the cleaning problem is especially difficult because aluminum anneals with the heat encountered and becomes extremely soft and unsubstantial. Disposable aluminum reflectors have been hand formed by the housewife from ordinary aluminum foil but such procedure is tedious and not entirely effective due to the difficulty in obtaining a smooth formed and correctly curved reflector surface.

It is a principal object of the present invention to provide a disposable reflector and drip collector element for cooking ranges or the like that is convenient to obtain and use and is most effective.

In accordance with the invention, a plurality of disposable reflector sheets are formed in nested configuration as the reflector elements in such manner that the uppermost sheet element may be peeled off and disposed of as it becomes soiled with drip collections. The lowermost sheet reflector element is formed of a material having a greater thickness than the upper disposable elements, thus providing a desirable mechanical support for the shape of the elements in use.

In order to minimize adhesion to each other of the separable disposable reflector element sheets, a further feature of the invention is the provision of a surface coating for each sheet and when the sheets are formed of aluminum the surface coating or coatings may be comprised of anodized aluminum.

Further objects, features, and the attendant advantages of the invention will be apparent with reference to the following specification and drawing in which.

Figure 1:
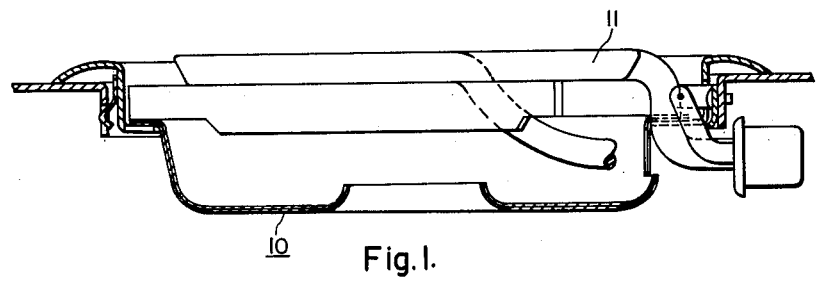
FIGURE 1 is a fragmentary sectional view of a cooking range heating unit with the disposable reflector assembly of the invention in place beneath the heating unit.
Figure 2:
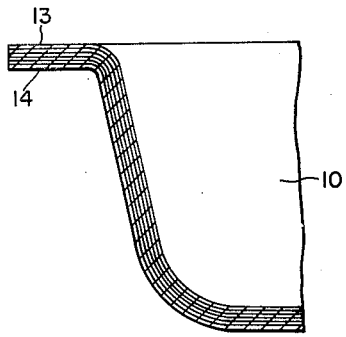
FIG. 2 is an enlarged fragmentary sectional view of the disposable reflector assembly of the invention.

Referring to FIGS. 1 and 2 of the drawing, an assembly of nested separable disposable reflector sheets is generally shown at 10 to be preshaped to the desired configuration for reflecting heat from beneath the heating unit 11 towards the cooking surface and for collecting drippings from the cooking pans. The exact shape of the reflector assembly is not critical but it will be noted that it is generally cup shaped in order to collect the drippings while still providing a desirable smooth reflecting surface. Obviously the shape of the reflector assembly may be varied to meet the specific requirements of the particular range heating unit 11 that is employed in the cooking range and to be removably supported thereunder. For example, an electric cooking and heating element 11 is shown in FIG. 1 of the drawings although it should be understood that the reflector assembly of the invention may be used with other types of heating units such as a gas burner or the like.

The disposable reflector assembly generally shown at 10 is comprised of a plurality of sheets of suitable reflector material such as aluminum and the uppermost sheets such as the sheet 13 may be formed of relatively thin gauge sheet material. In accordance with the invention, however, the lowermost reflector sheet 14 which would be the last sheet to be discarded, is formed of relatively heavy or thicker sheet material which may also be aluminum. The relatively thicker lowermost sheet element 14 thus provides the necessary mechanical support for the upper separable and disposable reflector sheets such as the sheet 13.

The manufacture of the disposable reflector assembly of the invention should now be obvious to one skilled in the art. For example, a plurality of thin sheets of aluminum may be superposed or laminated with the lowermost laminar sheet being comprised of relatively heavy gauge material compared to the upper separable and disposable laminar sheet. Thereafter the stacked or laminated sheets may be stamped to the desired dish or cup-shaped form and punched out of the sheet thus forming a disposable reflector assembly comprised of a plurality of nested sheet reflector elements. The use of such a disposable reflector assembly should be obvious, it being understood that the uppermost reflector sheet such as the sheet 13 (FIG. 2) is simply peeled off and discarded when it is soiled thus exposing the next lower reflector sheet element with a clean surface.

Figure 3:
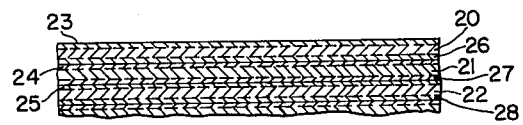
FIG. 3 is an enlarged fragmentary sectional view of a disposable reflector assembly of the invention embodying surface coatings to minimize adhesion between the separable disposable reflector sheets.

When aluminum sheet material is used to form the separable disposable reflector elements, it has been found that there is a tendency for the separable reflector sheets to adhere to each other and this tendency is increased by the exposure of the reflector assembly to the heat of the cooking unit. In accordance with a modified form of the invention as shown by FIG. 3 of the drawing, each disposable aluminum sheet 20, 21, 22 may be provided with an upper surface coating 23, 24, 25 respectively to minimize adhesion between the nested separable sheet elements. This coating may be formed of anodized aluminum which is a well known form of aluminum oxide obtained by the so-called anodizing process, the details of which are well known and need not be described herein. To further improve the separation function of the disposable reflector sheet elements both the upper and lower surfaces of each reflector sheet may be provided with the coating such as the anodized aluminum coating referred to. The fragmentary view of FIG. 3 of the drawings shows each of the sheets, 20, 21 and 22 to be provided with both upper and lower surface coatings of anodized aluminum, the lower surface coatings being shown by reference numerals 26, 27 and 28 respectively. It should be understood that the lowermost sheet element such as the element 14 of FIG. 2 which is of greater thickness than the others of the separable disposable reflector sheets need only be provided with an upper surface coating of anodized aluminum or the like when it is desired to improve the separation facility between it and the next above disposable sheet.

Although a preferred form of the invention has been described and the use of aluminum sheet material with anodized aluminum coatings has been specified it should be understood that the invention is not limited to such precise combination of specified materials since other sheet reflector material and coatings therefore may be employed as will be obvious to those skilled in the art.

I claim as my invention:

A disposable reflector assembly adapted to be positioned beneath a cooking range heating element comprising, a plurality of nested dished shaped reflector elements having an apertured central portion and each formed of a thin sheet of aluminum having surface coatings of anodized aluminum over substantially the entire surface thereof to minimize adhesion of the elements to each other, the lowermost sheet element having a greater thickness than the others of said sheet elements whereby the assembly may be retained beneath a range heating element and the uppermost reflector sheet may be peeled off and disposed of when it is soiled to thereby expose an underlying sheet element.

References Cited in the file of this patent

UNITED STATES PATENTS

| | | |
|---|---|---|
| 2,196,018 | Korpium | Apr. 2, 1940 |
| 2,496,349 | Kellgren et al. | Feb. 7, 1950 |
| 2,653,885 | Harper | Sept. 29, 1953 |
| 2,947,441 | Brannan | Aug. 2, 1960 |
| 3,076,579 | Kuhlman | Feb. 5, 1963 |

OTHER REFERENCES

Downs & Co. Ad., House Beautiful, November 1955.